2,977,323
PROCESS FOR REACTIVATING USED CRACKING CATALYSTS

Paul H. Johnson, Roy V. Denton, and Charles R. Eberline, Bartlesville, Okla., assignors to Phillips Petroleum Company, a corporation of Delaware No Drawing. Filed July 14, 1958, Ser. No. 748,186

5 Claims. (Cl. 252—415)

This invention relates to a process for improving the cracking characteristics of a cracking catalyst contaminated with deactivating poisons deposited thereon during the cracking of hydrocarbon material.

It is well known in the art that catalyst poisons such as nickel, vanadium and iron are introduced to the cracking reactor in hydrocarbon oils charged and especially in the heavy gas oils and crude oils when these are used. These poisons increase the production of hydrogen, dry gas and coke at the expense of the conversion of charge to gasoline. A most serious effect in most cases is the increased coke production, since most cracking units are limited in charge rate by regeneration capacity. Thus, it can be seen that deactivation of these poisons is highly desirable.

Accordingly, an object of the invention is to provide a process for deactivating metal-containing poisons accumulated on used cracking catalysts. Another object is to provide a treated catalyst which has lower hydrogen and coke-producing characteristics than the untreated catalysts. Other objects, as well as aspects and advantages, of the invention will become apparent from a consideration of the accompanying disclosure.

This invention is concerned with a method for the deactivation of metallic poisons accumulated on used cracking catalysts. The process comprises contacting the used catalyst after it has been regenerated with chlorine or HCl, or with a mixture of same, to obtain a catalyst which is then in a reactivated condition and ready for use in cracking. Preferably, and for best results, the catalyst is hydrated with steam at an elevated temperature after it has been regenerated and before use in cracking; this hydration can be effected either before or after the treatment with the chlorine, HCl, or mixture thereof. Both the hydration step and the treatment with the halogen compound are effected before the catalyst is contacted with hydrocarbons. No further regeneration of the catalyst in the presence of an oxygen-containing gas is effected after the treatment with the halogen containing compound. Hydration is most effective after treatment with the halogen compound. It is also within the scope of the invention to add both steam and the halogen compound to the catalyst at the same time.

The process can be practiced with fixed bed, gravitating moving bed, or fluidized bed cracking processes. The treating method used varies in details with the particular type of cracking process being used. In a fixed bed unit, the treatment can be effected by passing vapors of the treating agent over the catalyst and then the cracking cycle is repeated. Also, as stated, the catalyst can be hydrated either before or after the treatment with the halogen compound. In a fluidized bed process, the treatment can be carried out by adding the halogen compound to the catalyst as it is being transferred from the regeneration step to the cracking step, with or without the addition of steam for hydration before or after the addition of the halogen compound. In another method, a side stream of the catalyst from the main regeneration step is regenerated to a greater carbon removal than is usual commercial practice in an auxiliary regeneration step, and this catalyst is then admixed with the remainder of the regenerated catalyst from the main regeneration step before it is treated with the halogen compound and with steam, if steam is employed. This is beneficial in that the substantially completely regenerated catalyst is benefited by the treatment more than less completely regenerated material. Other specific methods of operation according to the invention can be readily devised, and will to some extent depend on the exact apparatus in which the cracking reaction is effected.

The treatment of the catalyst with the halogen compound, and also with steam, if employed, is advantageously effected at a temperature in the range of 850° F. to 1200° F., although temperatures not exceeding 1100° F. are usually employed.

The amount of treating agent employed is quite small, and the amount of chlorine, either free or combined as HCl, in the range of 0.05 to 10 pounds per ton (2000 lbs.) of catalyst is satisfactory, although amounts in the range of 0.1 to 1 pound per ton of catalyst are now preferred. Greater amounts than set forth can be employed, but little additional benefit is obtained except perhaps in cases of extremely large amounts of catalyst poisons.

The invention is applicable to the usual cracking catalysts, including natural silica-alumina clay cracking catalysts, such as acid-activated bentonites and acid-activated montmorillonite, as well as to synthetic cracking catalysts such as silica-alumina, silica-magnesia, silica-zirconia-alumina, and silica-boria cracking catalysts.

The oils which are used as feeds in catalytic cracking processes and often contain the metallic poisons such as vanadium and nickel include crude oils which have been topped to 400° F. The oils most usually employed as catalytic cracking feed stocks have a boiling range within the range from 400 to 1100° F.

EXAMPLE I

The catalyst used in these runs was a portion of equilibrium catalyst removed from a commercial fluidized bed cracking unit regenerator, an acid-treated natural silica-alumina clay catalyst. Portions of this same catalyst were employed in each of the examples of this invention. It contained over 2200 p.p.m. nickel and vanadium oxides. The catalyst contained 0.35 weight percent carbon as received, and this carbon was removed by oxidation regeneration substantially completely. During the regeneration the temperature was maintained at 920 to 970° F. for approximately three hours or to a $CO_2$ content in the regeneration gas of less than 0.1 percent.

The substantially completely regenerated catalyst was then treated with 5.2 pounds of HCl per ton of catalyst and then hydrated by contacting with steam at a temperature of 900° F. and atmospheric pressure. The hydration was effected by adding 3 cc. per minute of water (immediately converted to steam) per 1000 grams of catalyst, which gave sufficient vapor velocity to keep the catalyst in a fluidized state. In each run the length of the hydration period was maintained for 20 minutes at this rate. The catalyst was then used in a fluidized catalyst bed for cracking a Panhandle-West Texas wide range gas oil boiling in the range of about 450 to 1050° F., and containing small amounts of nickel and vanadium. In each of the examples of this application a sample of this same feed was employed. In all examples in this application cracking conditions were about 900° F. average bed temperature, 15 lbs. of steam per barrel of oil and about 10 p.s.i.g. The actual results are shown in Table I, while the results adjusted to 50 percent conversion are shown in Table II so that proper comparison can be made. The adjustment to 50 percent conversion level was made by running a series of base tests to secure a range of conversion levels and obtaining curves from these points. Each cycle of the present tests was interpolated to 50 percent conversion by paralleling the curves to the 50 percent level.

*Table I*

| Products | No HCl Treatment | HCl Treatment | |
|---|---|---|---|
| | | 1st cycle | 10th cycle |
| Gasoline, vol. percent | 35.1 | 34.0 | 33.4 |
| Dry gas (C₂ and lighter) c.f./bbl. Feed | 432 | 278 | 312 |
| Hydrogen, c.f./bbl. Feed | 335 | 200 | 217 |
| Carbon, wt. percent feed | 6.4 | 4.5 | 4.7 |
| Conversion, vol. percent | 49.9 | 44.5 | 46.1 |

*Table II*

| Products at 50% Conversion | No HCl Treatment | HCl Treatment | |
|---|---|---|---|
| | | 1st cycle | 10th cycle |
| Dry gas, c.f./bbl. feed | 432 | 335 | 352 |
| Hydrogen, c.f./bbl. feed | 335 | 240 | 272 |
| Gasoline, Volume Percent feed | 35.1 | 36.2 | 35.3 |
| Carbon, wt. percent feed | 6.4 | 4.9 | 5.6 |

The cracking period was about 13 minutes each cycle, and no additional HCl treatment was administered between the first and tenth cycles.

It will be noted that the HCl treatment reduced the hydrogen, dry gas and carbon, as well as increased the yield of gasoline; it will further be noted that the improvement was quite long-lasting as indicated by the data for the tenth cycle.

EXAMPLE II

The results below were obtained using portions of the same catalyst used in Example I which were completely regenerated. The comparative data were made with regenerated and hydrated catalyst using a 5-minute process cycle time. The test data for HCl and chlorine treatment were obtained using a sequence of regeneration, hydration, treatment with chlorine or HCl and then conducting the cracking step. Sufficient complete cycles were carried out before the data shown were obtained that the cumulative effect of the treatment had been obtained and equilibrium results are shown. Based on one ton of catalyst, the HCl treatment was effected with 0.15 pound/ton each cycle; and the chlorine treatment was effected with 0.19 pound/ton each cycle. The actual test results are shown in Table III, while Table IV shows the results corrected to 50 percent conversion, so that more precise comparison is facilitated.

*Table III*

| | No HCl or Cl₂ Treatment | HCl, 0.15 lb./ton | Cl₂, 0.19 lb./ton |
|---|---|---|---|
| Carbon, wt. percent | 5.6 | 4.2 | 3.9 |
| Gasoline, Volume percent | 35.3 | 38.3 | 38.1 |
| Hydrogen, c.f./bbl | 235 | 95 | 73 |
| Conversion, Volume percent | 47.5 | 47.9 | 47.3 |

*Table IV*

| | No HCl or Cl₂ Treatment | HCl, 0.15 lb./ton | Cl₂, 0.19 lb./ton |
|---|---|---|---|
| Carbon, wt. percent | 6.3 | 4.7 | 4.3 |
| Gasoline, Volume percent | 37.5 | 39.0 | 39.4 |
| Hydrogen, c.f./bbl | 260 | 155 | 85 |
| Conversion, Volume percent | 50 | 50 | 50 |

This example illustrates that after equilibrium is reached, the effect of the treatment is much more pronounced.

EXAMPLE III

Three more runs were made in the same general manner as in Example I, but the regenerated catalyst obtained from the commercial operations and containing 0.35 weight percent carbon was not further regenerated with an oxygen-containing gas. In all three runs the hydration was effected under the conditions set forth in Example I; however, in one of the runs hydration followed treatment by HCl, while in another of the runs hydration preceded treatment with HCl. In each of the runs the cracking cycle was 12 minutes. In the runs employing an HCl treatment, an amount of HCl equivalent to 9.5 pounds per ton of catalyst was employed. The data, adjusted to 50 percent conversion for better comparison, are shown in Table V.

*Table V*

| | No HCl Treatment | Hydration followed by HCl | HCl followed by Hydration |
|---|---|---|---|
| Net carbon, wt. percent feed | 5.4 | 5.4 | 5.0 |
| Gasoline, Vol. percent feed | 36.2 | 35.4 | 35.7 |
| Hydrogen c.f./bbl. feed | 340 | 238 | 240 |
| Dry gas, c.f./bbl. feed | 465 | 362 | 325 |
| Conversion, Vol. percent | 50 | 50 | 50 |

EXAMPLE IV

In this example Run Nos. 1 thru 4 were made, Run No. 1 being the control run in which the catalyst was hydrated between the regeneration step and the cracking step with steam in the manner described in Example I. In all runs the catalyst was regenerated to an essentially free carbon state as described in Example I before the treatment steps. In Run No. 2 and in Run Nos. 3 and 4 the catalyst was both hydrated and treated with chlorine, in the order indicated in Table VI. In Run Nos. 2 and 3 about 4.7 pounds of chlorine per ton of catalyst was employed, and in Run No. 4 about 0.01 pound of chlorine per ton of catalyst was employed in the chlorine treating step. This amount is lower than usually used but, as will be seen, the effect is still quite substantial.

*Table VI*

| | No HCl or Cl₂ Treatment | Hydration followed by Cl₂ | Cl₂ followed by Hydration | |
|---|---|---|---|---|
| Run No | 1 | 2 | 3 | 4 |
| Total Dry gas, including H₂ | 401 | 230 | 182 | 370 |
| Carbon, wt. percent of feed | 6.0 | 5.0 | 4.1 | 5.0 |
| Gasoline, Vol. percent of feed | 35.6 | 36.6 | 38.0 | 36.5 |
| Conversion | 50 | 50 | 50 | 50 |

In all of the runs the cracking cycle was about 13 minutes. Runs 2 and 3, compared, show the relatively greater effectiveness of the halogen treating step which is obtained by following the chlorine treatment with hydration rather than hydrating first and then treating with chlorine. Both methods are quite effective, and, the method of Run 2 is seen to be very effective when the treatments are repeated a number of times in order to come to equilibrium, as has been shown in Example II. Run No. 4 shows that even extremely small amounts of chlorine are quite effective to accomplish the purposes of the invention.

EXAMPLE V

In this example the catalyst received from the plant, which was used in all of the examples in this application and contain 0.35 weight percent carbon, was first used in a cracking step in order to raise the coke level. In Table VII are shown the results of the three runs of this example. In Run No. 1 the procedure was as follows: The catalyst was regenerated with air at the rate of 10 to 12 cubic feet of air per hour at an average temperature of about 900° F. until the coke level was 0.5 weight percent. Then in a second stage of regeneration the temperature was raised to about 1100° F. and the regeneration continued until essentially all of the coke was removed from the catalyst. The usual cracking test run was then effected on this catalyst without any hydration before containing with the oil feed. In Run No. 2 the two regeneration steps were effected as in Run No. 1, but between the first and second regeneration steps the catalyst was treated by contacting it with about 4.7 pounds of chlorine per ton of catalyst. In Run No. 3 the same two regeneration steps as in Run No. 1 were effected and thereafter the catalyst was treated by contacting with about 4.7 pounds of chlorine per ton of catalyst. Each of the three treated catalysts were then employed in a cracking cycle of about 13 minutes. The results are shown in Table VII.

Table VII

| Run No. | 1 | 2 | 3 |
|---|---|---|---|
| Conversion, Percent | 50 | 50 | 50 |
| Carbon, Wt. Percent of Feed | 5.8 | 5.4 | 5.1 |
| Gasoline, Vol. Percent of Feed | 36.4 | 37.0 | 37.3 |

It will be seen that Run No. 3 was much more effective than Run No. 2 wherein the chlorine treatment was effected in the middle of the regeneration procedure rather than after the regeneration step had been completed.

As will be evident to those skilled in the art, various modifications of this invention can be made or followed in the light of the foregoing disclosure and discussion without departing from the spirit or scope of the disclosure or from the scope of the claims.

We claim:

1. In a process for reactivating a used cracking catalyst that has been employed in cracking a hydrocarbon containing at least one of nickel, vanadium and iron, and which comprises regeneration of said catalyst by burning carbonaceous material therefrom with an oxygen-containing gas and then returning the catalyst to the cracking step, the improvement which comprises contacting at a temperature from 850–1200° F. said catalyst with seam and with at least one chlorine compound selected from the group consisting of free chlorine and HCl and in an amount providing from 0.05 to 10 pounds of chlorine per ton of catalyst, after said regeneration and before said cracking step without further regeneration, thereby reactivating the catalyst containing metallic poisons deposited on said catalyst as a result of being employed in cracking said hydrocarbon containing at least one of nickel, vanadium and iron.

2. A process of claim 1 wherein said catalyst is a silica-alumina catalyst.

3. In a process for reactivating a used cracking catalyst that has been employed in cracking a hydrocarbon containing at least one of nickel, vanadium and iron, and which comprises regeneration of said catalyst by burning carbonaceous material therefrom with an oxygen-containing gas and then returning the catalyst to the cracking step, the improvement which comprises contacting said catalyst with steam and thereafter contacting at a temperature from 850–1200° F. said catalyst with at least one chlorine compound selected from the group consisting of free chlorine and HCl and in an amount providing from 0.05 to 10 pounds of chlorine per ton of catalyst, after said regeneration and before said cracking step without further regeneration, thereby reactivating the catalyst containing metallic poisons deposited on said catalyst as a result of being employed in cracking said hydrocarbon containing at least one of nickel, vanadium and iron.

4. In a process for reactivating a used cracking catalyst that has been employed in cracking a hydrocarbon containing at least one of nickel, vanadium and iron, and which comprises regeneration of said catalyst by burning carbonaceous material therefrom with an oxygen-containing gas and then returning the catalyst to the cracking step, the improvement which comprises contacting at a temperature from 850–1200° F. said catalyst with at least one chlorine compound selected from the group consisting of free chlorine and HCl and in an amount providing from 0.05 to 10 pounds of chlorine per ton of catalyst and contacting at a temperature from 850–1200° F. said catalyst with steam following the contacting with said chlorine compound, both the contacting with the chlorine compound and the steam being after said regeneration and before said cracking step without further regeneration, thereby rectivating the catalyst containing metallic poisons deposited on said catalyst as a result of being employed in cracking said hydrocarbon containing at least one of nickel, vanadium and iron.

5. In a process for rectivating a used silica-alumina cracking catalyst that has been employed in cracking a hydrocarbon oil boiling in the range from 400 to 1400° F. and containing small amounts of at least one of nickel, vanadium and iron as impurities, and which comprises regeneration of said catalyst by burning said carbonaceous material therefrom with an oxygen-containing gas and then returning the catalyst to the cracking step, the improvement which comprises contacting said catalyst with steam and with at least one chlorine compound selected from the group consisting of chlorine and HCl at a temperature in the range from 850 to 1200° F. and in an amount providing from 0.05 to 10 pounds of chlorine per ton of catalyst, said contacting with said steam and with said chlorine compound being after said regeneraiton and before said cracking step without further regeneration, thereby reactivating the catalyst containing metallic poisons deposited on said catalyst as a result of being employed in cracking said oil.

References Cited in the file of this patent

UNITED STATES PATENTS

| 1,817,968 | Cross | Aug. 11, 1931 |
| 2,246,900 | Schulze et al. | June 24, 1941 |
| 2,488,718 | Forrester | Nov. 22, 1949 |
| 2,668,798 | Plank | Feb. 9, 1954 |

UNITED STATES PATENT OFFICE
CERTIFICATE OF CORRECTION

Patent No. 2,977,323                 March 28, 1961

Paul H. Johnson et al.

It is hereby certified that error appears in the above numbered patent requiring correction and that the said Letters Patent should read as corrected below.

Column 5, line 47, for "seam" read -- steam --.

Signed and sealed this 24th day of October 1961.

(SEAL)
Attest:

ERNEST W. SWIDER                 DAVID L. LADD
Attesting Officer                 Commissioner of Patents

USCOMM-DC